United States Patent
Allan et al.

(10) Patent No.: US 8,223,068 B2
(45) Date of Patent: Jul. 17, 2012

(54) METHOD AND SYSTEM FOR LOGGING POSITION DATA

(75) Inventors: Robert M. Allan, Christchurch (NZ); Julian Idle, Christchurch (NZ); Peter G. France, Christchurch (NZ); John F. Rogers, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 219 days.

(21) Appl. No.: 12/545,290

(22) Filed: Aug. 21, 2009

(65) Prior Publication Data

US 2010/0225533 A1     Sep. 9, 2010

Related U.S. Application Data

(60) Provisional application No. 61/158,624, filed on Mar. 9, 2009.

(51) Int. Cl.
*G01S 19/40* (2010.01)
*G01S 19/37* (2010.01)
*G01S 19/20* (2010.01)

(52) U.S. Cl. .......... 342/357.23; 342/357.77; 342/357.58

(58) Field of Classification Search ............ 342/357.23–357.28, 357.31, 357.41–357.44, 357.62, 357.64, 342/357.66, 357.75–357.77, 357.47, 450–452, 342/375.58; 701/213–215; *G01S 19/07, G01S 19/23, 19/37, 19/40, 19/42*
See application file for complete search history.

(56) References Cited

U.S. PATENT DOCUMENTS

| | | | | | |
|---|---|---|---|---|---|
| 5,373,298 | A | * | 12/1994 | Karouby | 342/357.22 |
| 6,324,474 | B1 | * | 11/2001 | Beisner et al. | 701/215 |
| 6,369,754 | B1 | * | 4/2002 | Levanon | 342/357.2 |
| 6,408,246 | B1 | * | 6/2002 | Fox | 701/300 |
| 6,970,796 | B2 | * | 11/2005 | Tashev | 702/94 |
| 2005/0101248 | A1 | | 5/2005 | Vollath | |
| 2009/0119015 | A1 | * | 5/2009 | Chansarkar et al. | 701/215 |
| 2009/0135057 | A1 | * | 5/2009 | Vollath et al. | 342/357.03 |

OTHER PUBLICATIONS

"Getting Started Guide", *GeoExplorer 2005 Series*, Version 1.00, Revision A, Part No. 46506-40-ENG Trimble Navigation Limited, (Oct. 2005),114 Pages.

"Getting Started Guide", *GPS Pathfinder Office Software*, Version 3.10, Revision A. Part No. 24231-31-ENG, Trimble Navigation Limited, (Apr. 2005),158 pages.

"Getting Started Guide", *Trimble GPS Analysis Extension*, Version 1.10, Revision A, Part No. 52652-01, (Apr. 2005),240 pages.

"GPS Pathfinder OFfice Release Notes", Version 3.10. Part No. 34195-31-ENG, Revision A. Trimble Navigation Limited, (Apr. 2005),24 pages.

"GPS Pathfinder Tools SDK: Release Notes", Version 2.00, PArt No. 37237-61-ENG, Revision A, (Jun. 2005),44 Pages.

"Quick Reference Guide", *Trimble GPSCorrect Extension*. Version 1.0, Revision A. Trimble Navigation Limited, (Apr. 2005),114 pages.

"Trimble GPS Analysis Extension: Release Notes", Version 1.10, pArt No. 52652-01. Revision A, (Apr. 2005),28 pages.

"Trimble GPScorrect Extension", *Release Notes*, Version 1.11. Revision A. Trimble Navigation Limited, (Apr. 2005),38 pages.

(Continued)

*Primary Examiner* — Gregory C. Issing (57) ABSTRACT

According to embodiments, a method of logging position data is provided. An indication of a desired accuracy value for determining a geographic position is received. A geographic position is then received. A predicted post-processed accuracy value for the received geographic position is then calculated. The desired accuracy value is then compared with the predicted post-processed accuracy value for the received geographic position. When the predicted post-processed accuracy value for the received geographic position is at least as precise as the desired accuracy value, the geographic position is logged.

18 Claims, 5 Drawing Sheets

OTHER PUBLICATIONS

"User Guide: GPSs Pathfinder Pro Series", Version 1.00, Revision A. Trimble Navigation Limited, (May 2005),46 pages.

"White Paper: H-Star Technology Explained", *Trimble Navigation Limited*, (2005),9 pages.

Bisnath, S et al., "Evaluation of Commercial Carrier Phase-Based WADGPS Services for Marine Applications", *ION GPS/GNSS*. Portland, OR, (Sep. 9-12, 2003),17-27.

Chen, K et al., "Real-Time Precise Point Positioning Using Single Frequency Data", *ION GNSS 18th International Technical Meeting of the Satellite Division*, Long Beach, CA, (Sep. 13-16, 2005),1514-1523.

Gao, Y et al., "High Precision Kinematic Positioning Using Single Dual-Frequency GPS Receiver", *The International Archives of the Photogrammerty, Remote Sensing and Spatial Information Sciences*, vol. 34, Part XXX, 5 pages.

Gill, E. et al., "High Precision Onboard Orbit Determination for Small Satellites—the GPS-Based XNS on X-SAT", *6th Symposium on Small Satellites Systems and Services*. La Rochelle, France, (Sep. 20-24, 2004),1-6.

\* cited by examiner

```
START
  ↓
RECEIVING AN INDICATION OF A DESIRED ACCURACY VALUE FOR
DETERMINING A GEOGRAPHIC POSITION
410
  ↓
RECEIVING A GEOGRAPHIC POSITION
420
  ↓
CALCULATING A PREDICTED POST-PROCESSED ACCURACY VALUE
FOR SAID RECEIVED GEOGRAPHIC POSITION
430
  ↓
COMPARING SAID DESIRED ACCURACY VALUE WITH SAID PREDICTED
POST-PROCESSED ACCURACY VALUE FOR SAID RECEIVED
GEOGRAPHIC POSITION
440
  ↓
LOGGING SAID RECEIVED GEOGRAPHIC POSITION WHEN SAID
PREDICTED POST-PROCESSED ACCURACY VALUE FOR SAID
RECEIVED GEOGRAPHIC POSITION IS AT LEAST AS PRECISE AS
SAID DESIRED ACCURACY VALUE
450
  ↓
END
```

METHOD AND SYSTEM FOR LOGGING POSITION DATA

CROSS REFERENCE TO RELATED APPLICATIONS

This application claims priority to the co-pending provisional patent application, Ser. No. 61/158,624, entitled "METHOD AND SYSTEM FOR LOGGING POSITION DATA," with filing date Mar. 9, 2009, assigned to the assignee of the present application, and hereby incorporated by reference in its entirety.

The content of U.S. patent application Ser. No. 11/786,017 filed Apr. 9, 2007 is incorporated herein by reference in its entirety, and the content of provisional U.S. patent application No. 60/792,911 filed Apr. 17, 2006 is incorporated herein by reference in its entirety.

BACKGROUND

When collecting global navigation satellite systems (GNSS) data, it is often useful to know the accuracy of the determined position. Some existing Global Positioning System (GPS) receivers output an estimate of the accuracy of the position calculated at each epoch. This estimate is known as a real-time accuracy estimate.

Many users perform post-processed differential correction to improve the accuracy of the GPS positions. The real-time accuracy estimate is not a good indication of the accuracy that will be achieved later after post-processing. For example, a receiver may be calculating autonomous positions or may be applying differential corrections to code solutions whereas the processor may be calculating more accurate carrier-phase solutions.

BRIEF DESCRIPTION OF DRAWINGS

The accompanying drawings, which are incorporated in and form a part of this application, illustrate various embodiments of the presented technology, and together with the description of embodiments, serve to explain the principles of the presented technology. Unless otherwise noted, the drawings referred to this description should be understood as not being drawn to scale.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. Furthermore, in the following description, numerous specific details are set forth in order to provide a thorough understanding of the subject matter. In other instances, well-known methods, procedures, objects, and circuits have not been described in detail as not to unnecessarily obscure aspects of the subject matter.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing terms such as "receiving," "calculating," "comparing," "logging," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
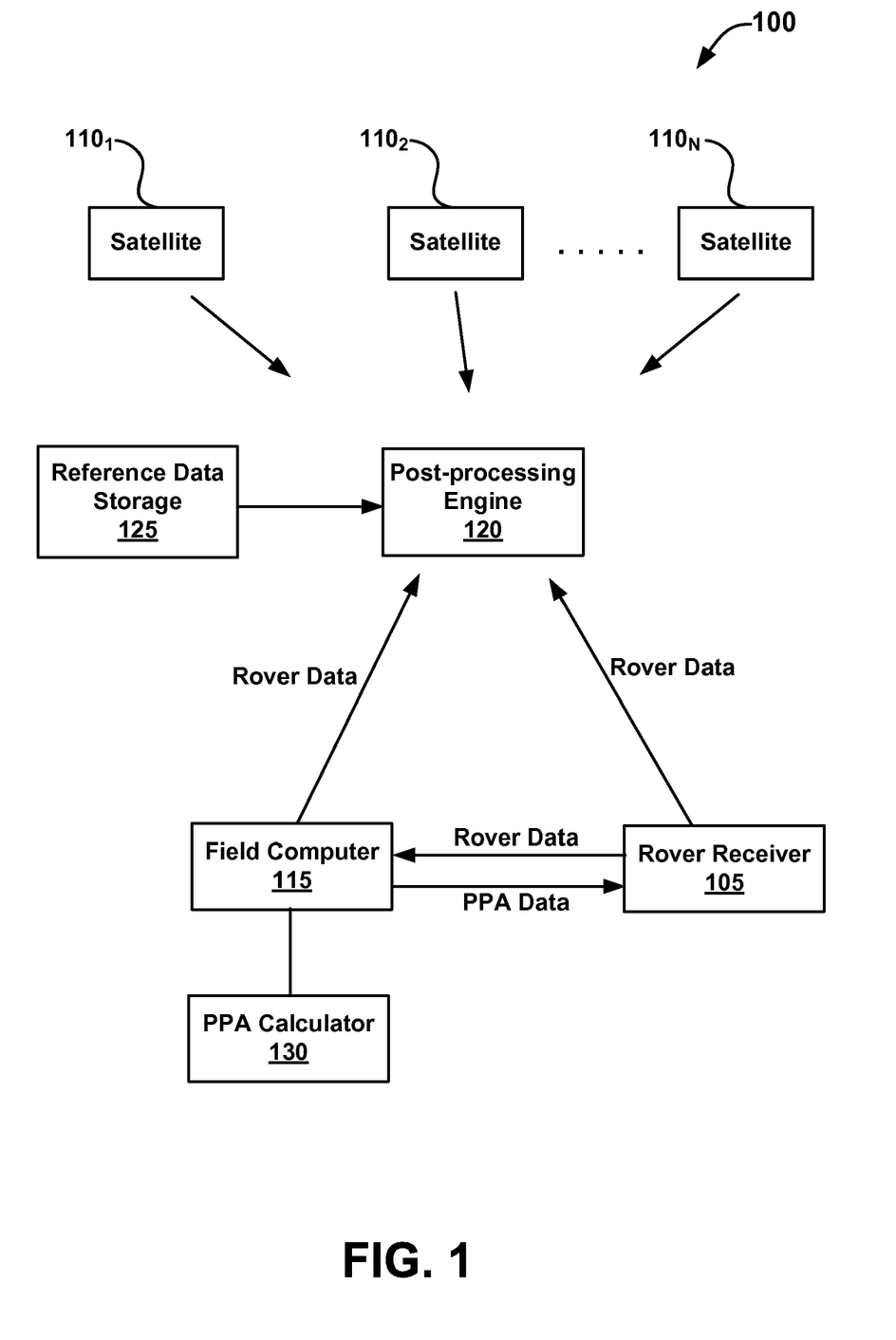
FIG. 1 shows a system in which the present technology is implemented, in accordance with an embodiment.

FIG. 1 is a high level view of a system 100 in which embodiments of the present technology may be implemented. A hand held rover receiver 105 is used to collect measurement data from satellites $110_1, 110_2 \ldots 110_N$. The data collected by rover receiver 105 is used to generate estimates of the geographic position of rover receiver 105. For the purposes of the present technology, the term "geographic position" means the determining in at least two dimensions (e.g., latitude and longitude), the location of rover receiver 105. It is noted that the geographic position can also include a measurement of the elevation of rover receiver 105 above a given reference elevation. The data from the rover receiver 105 is optionally transferred to a field computer 115 such as a pocket PC or laptop personal computer. The field computer typically includes field data storage such as a magnetic or optical disk drive or non volatile memory or other type of storage.

The collected data is transferred by a suitable data network to a post-processing engine 120. It will be appreciated that the post-processing engine 120 receives data either from the rover receiver 105 and/or from the field computer 115. Post-processing engine 120 obtains reference data from reference data storage 125. The reference data is typically obtained from one or more reference receivers (not shown). Examples of sources of reference data include, but are not limited to, implementations of Differential GPS (DGPS) reference stations and implementations of Real-time Kinematics (RTK) reference stations.

In one embodiment of the present technology, a prediction of post-processed accuracy is supplied at the time of measurement. This prediction refers to the likely accuracy of the position when it is recalculated later, after the data has been post-processed (e.g., by post-processing engine 120). This predicted post-processed accuracy value is very useful to the user to optimize productivity when a certain threshold of accuracy is desired. It is very costly to revisit a site if desired accuracy is not achieved. Similarly, it is unproductive to collect GPS measurements at a point for longer than necessary. While embodiments of the present technology will be described with reference to GPS systems, it is noted that embodiments of the present technology are operable with a variety of implementations of Global Navigation Satellite System (GNSS) signals including, but not limited to, Galileo, GPS (Global Positioning System), Glonass, WAAS (Wide Area Augmentation Service), Egnos, and the like.

Predicted post-processed accuracy (PPA) is particularly useful when carrier float solutions are to be calculated during post-processing. The accuracy of a carrier float solution increases according to the duration for which a measurement is continuously collected by the rover receiver 105. A predicted post-processed accuracy indicator answers a question such as "Have I collected data here long enough to get the 25 cm post-processed accuracy that is desired?"

In one embodiment, post-processing accuracy is predicted during data collection using a look-up table. The input variables to the look-up table include duration since carrier lock was acquired; horizontal dilution of precision (HDOP), the number of GNSS satellites being continuously tracked, and whether single or dual frequency carrier data is being logged.

The above parameters are fed into a function that looks up a PPA value from a predefined table. The values in the table have been assigned as a result of prior test processing with the parameters.

The receiver calculates, during data collection, a prediction of the accuracy likely to be achieved after post-processing. This helps to optimize productivity when collecting GNSS data for which post-processed accuracy is important.

System 100 further includes a PPA calculator 130. This PPA calculator 130 determines a prediction of the post-processed accuracy. The PPA calculator 130 typically runs on the field computer 115 and/or rover receiver 105. In one embodiment, PPA calculator 130 is implemented as a set of computer executable instructions. In another embodiment, PPA calculator 130 is implemented as computer hardware components, a combination of computer hardware and firmware components, or a combination of computer hardware and software components. In one embodiment, the PPA value(s) is/are calculated in real time by PPA calculator 130. As each epoch of GNSS rover data arrives from the rover receiver 105, the PPA calculator 130 uses the rover measurement data as input. The PPA calculator 130, through field computer 115, outputs PPA data for each epoch. In another embodiment, PPA data for each epoch is generated by a PPA calculator 130 disposed within, or communicatively coupled with, rover receiver 105.

The rover receiver 105 typically does not have a sophisticated user interface. A field computer 115 typically provides the user interface. The field computer 115 further provides data storage. It will be appreciated however that the rover receiver 105 could also provide some, or all of, the data storage for implementing the present technology. It will also be appreciated in some cases that the rover receiver 105 and field computer 115 are integrated into the same device. In this case the PPA calculator 130 would execute on the combined device.

Figure 2:
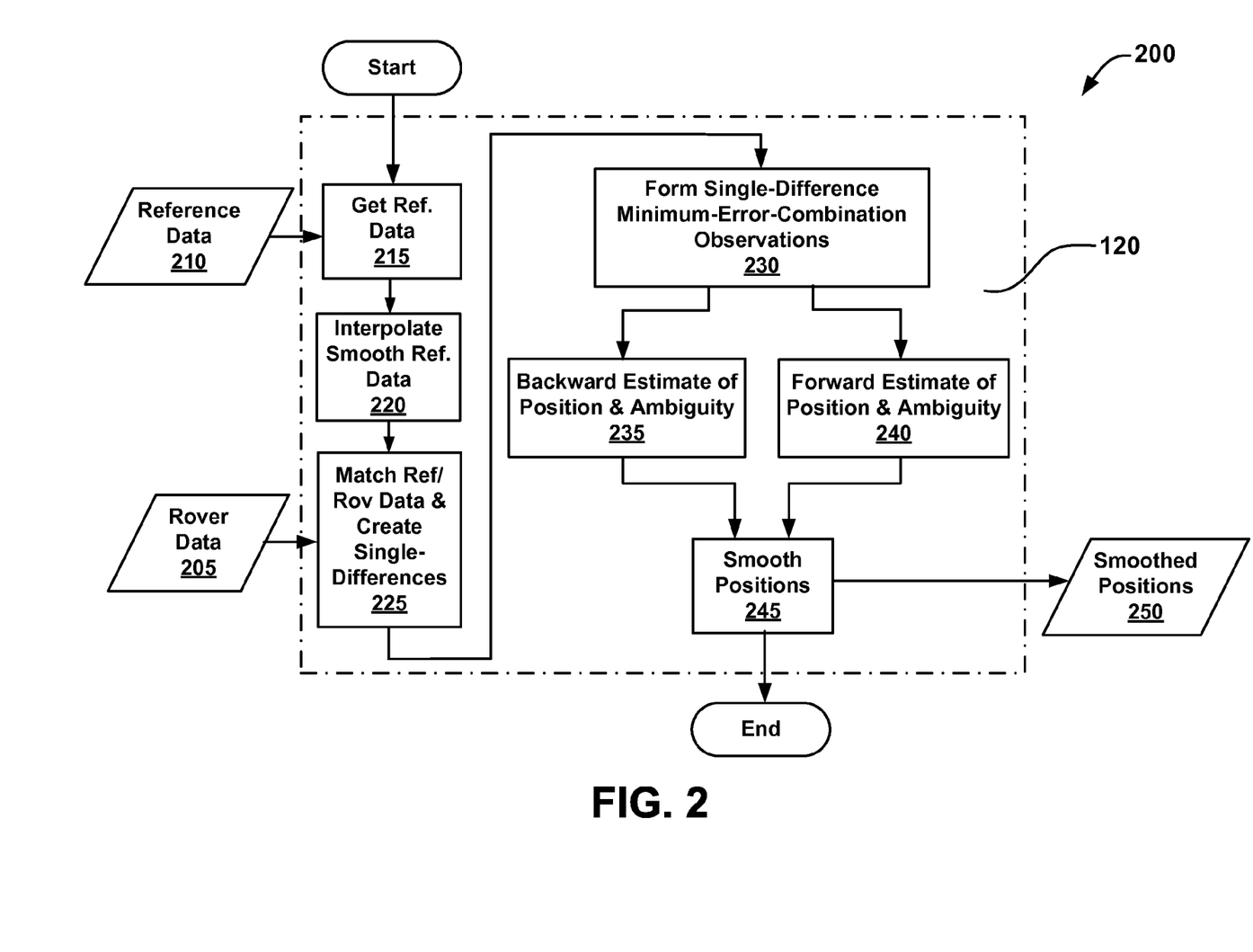
FIG. 2 shows a form post-processing engine for use in accordance with an embodiment of the present technology.

One embodiment of the present technology provides a post-processing engine similar to the post-processing engine 200 shown in FIG. 2. In one embodiment, engine 200 enables a user to achieve 2 decimeter horizontal accuracy over a short occupation time of 2 minutes with dual-frequency differential carrier phase positioning for baselines up to several hundred kilometers.

The post-processing engine 200, in one embodiment, includes 7 basic modules for post-processing and transformation of a set of rover data 205 with reference data 210. The post-processing engine includes a module 215 that takes as input the reference data 210. Module 220 interpolates and smoothes the reference data from 30-second intervals to i-second intervals. Module 225 matches the reference data and rover data. Module 230 forms the single-difference minimum-error-combination observations. Module 235 prepares a backward estimate of the position and ambiguity. Module 240 prepares a forward estimate of the position and ambiguity. Module 245 smoothes the positions by combining the backward and forward estimate results. The result is a set of smoothed positions 250. It is noted that the operations described above refer to data processing operations well known in the art.

Other configurations of the post-processing engine 200 are envisaged. For example, the functions of various modules described above are combined in other embodiments. In one embodiment, the modules described above are implemented as computer hardware, or a combination of computer hardware and firmware components. In another embodiment, the modules described above are implemented as computer readable instructions that reside in computer readable memory units or other computer readable storage media and are executed by a processor(s) of field computer 115 and/or rover receiver 105. When executed, the instructions cause field computer 115 and/or rover receiver 105 to perform specific actions and exhibit specific behavior that is described in detail herein.

The operation of each of the modules is further described in US patent application publication 2008/0165053 entitled "Fast Decimeter-Level GNSS Positioning," to Liu et al, which is hereby incorporated by reference.

Figure 3:
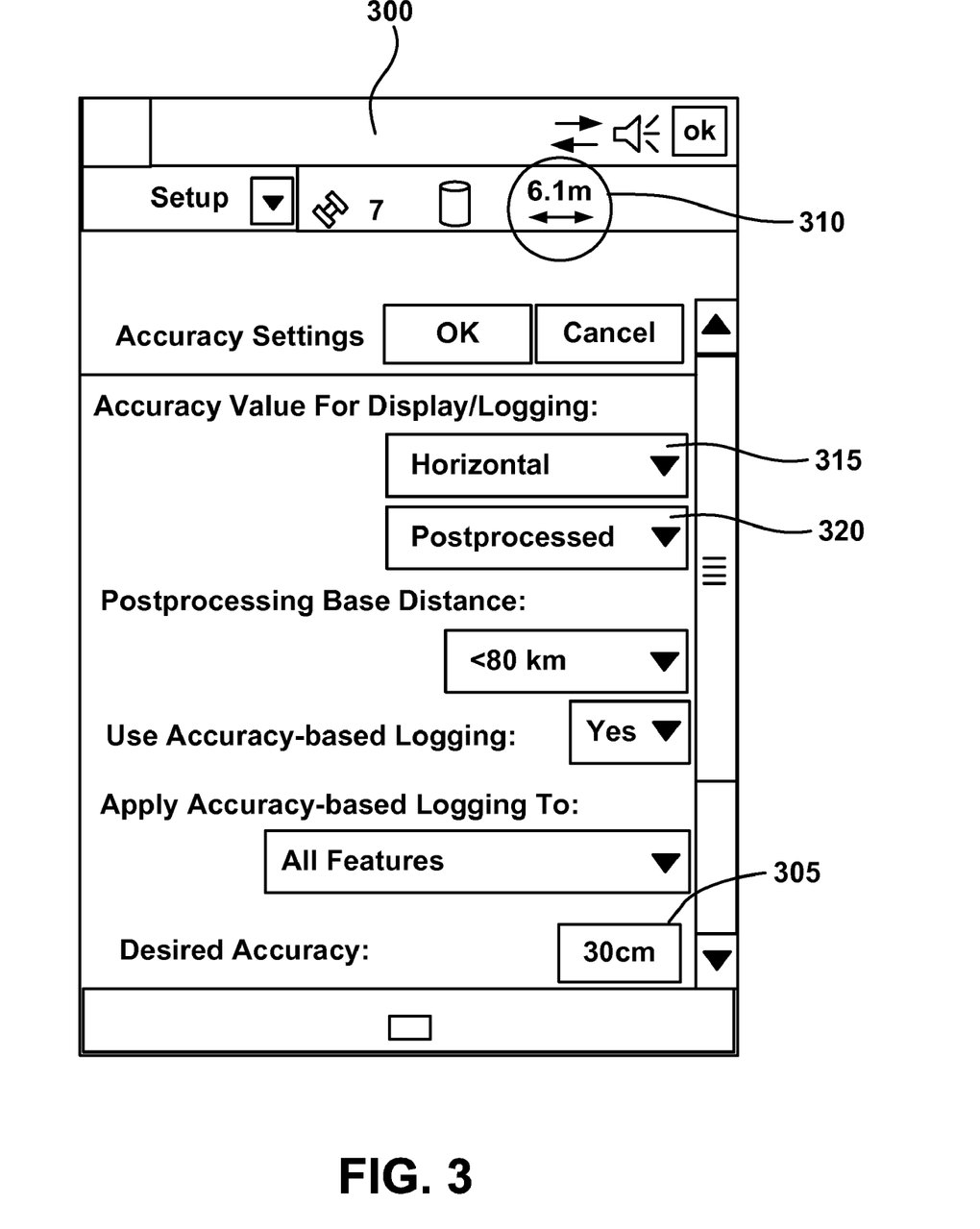
FIG. 3 shows a form user interface displayed to a user, in accordance with an embodiment of the present technology.

FIG. 3 shows an embodiment of a user interface 300 displayed to a user from a field computer 115 and/or rover receiver 105. In one embodiment, interface 300 is used to input parameters into PPA calculator 130. The interface 300 permits a user to enter a desired accuracy value indicated at 305. In one embodiment, the field computer 115 and/or rover receiver 105 includes a data entry interface that enables a user to enter a value. Alternatively the interface enables the user to select a desired accuracy value from a list of more than one available.

The user then calculates a position by operating the rover receiver 105. The PPA calculator 130 uses the parameters input via interface 300 and the collected GPS data and transforms this data to generate a predicted post-processed accuracy value for the position. This predicted post-processed accuracy value represents a prediction of the accuracy that is likely to be achieved once the rover data is post-processed.

In one embodiment, the estimated post-processed accuracy value is displayed on the user interface 300, for example at 310.

The accuracy of post-processed positions is often inversely related to the length of time that a user continuously collects rover data at a point. The longer the duration of data collection, the better the accuracy in determining the geographic position. This is indicated by a smaller predicted accuracy value.

The desired accuracy value is compared with the predicted post-processed accuracy value. If the predicted post-processed accuracy is at least as precise as the desired accuracy, then the position is logged. For example, if an accuracy value of 25 cm is desired, and the predicted post-processed accuracy value for a given geographic position is 10 cm, the geographic position is logged. The user can stop collecting rover data from that location and move on to the next location.

In one embodiment, the user interface displays a message or emits a sound or tone to indicate that the desired accuracy has been reached.

In one embodiment of the present technology, the user is able to select between horizontal accuracy and vertical accuracy. An exemplary drop down list for a user to select between vertical accuracy and horizontal accuracy is shown at 315. Vertical accuracy is of interest to some users, for example, water utilities, who are concerned with the flow of water at particular points. It will be expected that where a user has selected horizontal accuracy then the predicted post-processed accuracy value is a horizontal accuracy value. Alternatively, where a user has selected vertical accuracy value, the estimated post-processed accuracy value is a vertical value. In another embodiment, both the vertical and horizontal accuracy values are selected and displayed on user interface 300.

The user is also optionally able to select between a post-processed accuracy value and a real-time accuracy value as indicated at 320. As shown in FIG. 3, the user has selected the post-processed option.

If the user alternatively selects a real-time or "in the field" option at 320, the estimated accuracy value is an estimated real-time accuracy value. The estimated real-time accuracy value is an estimate of the accuracy being achieved for that position in the field. The required accuracy value is compared with the estimated real-time accuracy value. In one embodiment, the position is logged only if the estimated real-time accuracy value is better than the desired accuracy.

In another embodiment of the present technology, the user enters a desired accuracy value as described above. The user calculates two or more positions instead of a single position. In one embodiment, a user calculates several positions for a point feature. The present embodiment calculates respective predicted post-processed accuracy values as described above for the calculated positions. The desired accuracy values are compared with the estimated accuracy value. Only those positions are logged for which the estimated accuracy is at least as precise as the desired accuracy.

In one embodiment, an average of all those values that have been logged is then calculated. The position data for the point feature is then calculated at least partly from the calculated average. It will be appreciated that the calculated average could be smoothed, offset or weighted in known ways.

In another embodiment a user records a line feature by calculating the positions of a plurality of points along the line. In one embodiment, only those points along the line that have an estimated accuracy at least as precise as the desired accuracy are logged.

Figure 4:
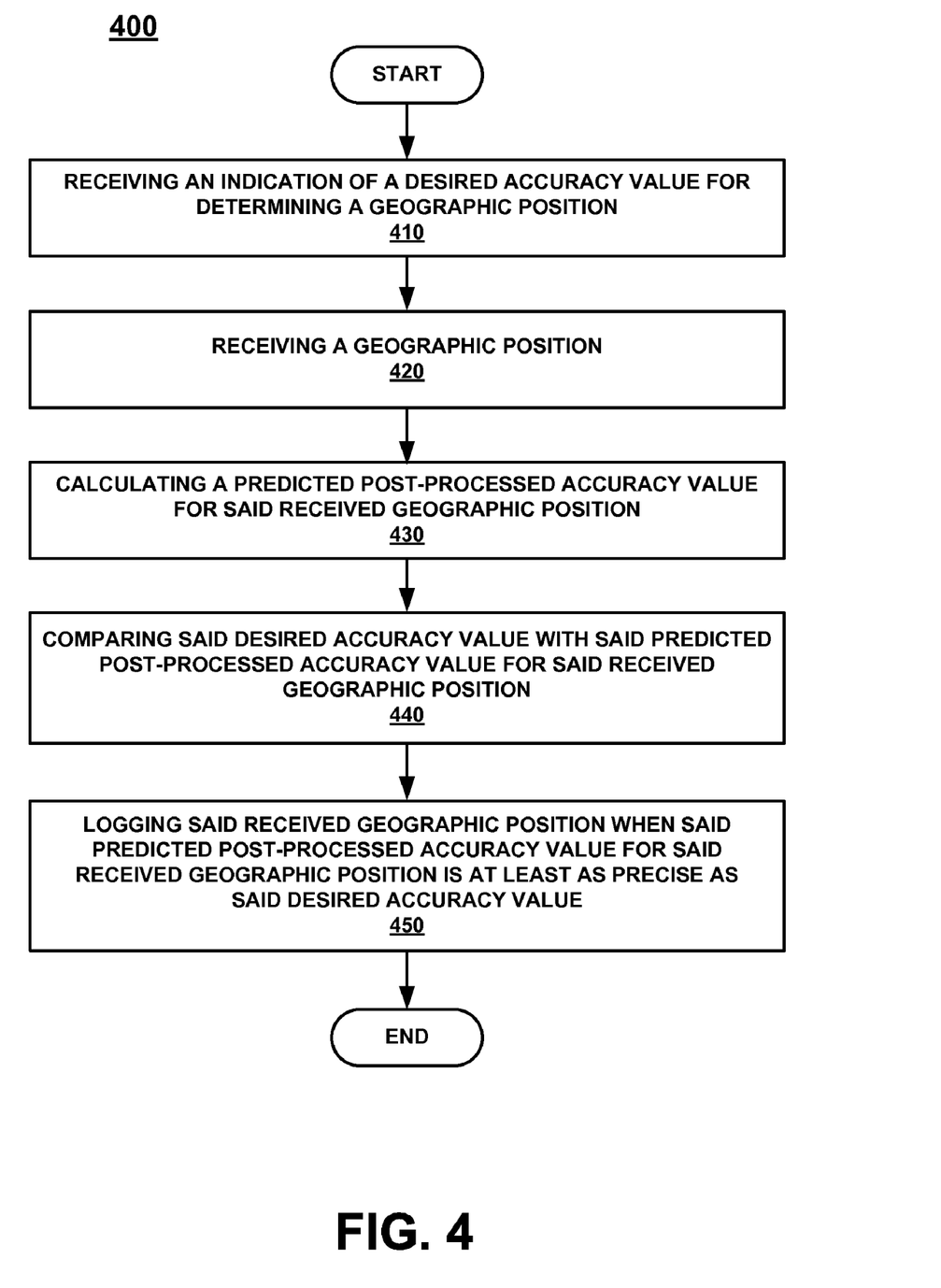
FIG. 4 is a flowchart of a method for logging position data in accordance with an embodiment of the present technology.

FIG. 4 is a flowchart of a method 400 for logging position data in accordance with an embodiment of the present technology. In operation 410 of FIG. 4, an indication of a desired accuracy value is received. As described above, in one embodiment, a user can input a desired accuracy level using interface 300.

In operation 420 of FIG. 4, a geographic position is received. In one embodiment, rover receiver 105 receives satellite positioning and timing signals from satellites $110_1$, $110_2 \ldots 110_N$ and generates a geographic position based thereon. It is noted that the generation of a geographic position may be performed by rover receiver 105 or field computer 115 in embodiments of the present technology based upon GPS observables received by rover receiver 105.

In operation 430 of FIG. 4, a predicted post-processed accuracy value for the received geographic position is calculated. As described above, PPA calculator 130 determines a post-processing accuracy value for a given geographic position. In embodiments of the present technology, this value represents an estimate of the precision in determining the geographic position of rover receiver 105. The geographic position can be received from another device such as when field computer 115 receives a calculated geographic position from rover receiver 105. Alternatively, field computer 115 can receive raw data from rover receiver 105 which it then converts to a geographic position which is received by PPA calculator 130. In another embodiment, PPA calculator 130 is disposed within rover receiver 105 and receives a geographic position from a position determining device (e.g., 511 of FIG. 5).

In operation 440 of FIG. 4, the desired accuracy value is compared with the predicted post-processed accuracy value for the geographic position. In embodiments of the present technology, the comparison of the desired accuracy value with the predicted post-processed accuracy value is performed by field computer 115 and/or rover receiver 105.

In operation 450 of FIG. 4, the geographic position is logged when the predicted post-processed accuracy value for the geographic position is at least as precise as the desired accuracy value. In one embodiment, the logging of geographic positions is performed by rover receiver 105. In another embodiment, the logging of the geographic position of rover receiver 105 is performed by field computer 115 or by another device communicatively coupled with rover receiver 105.

Figure 5:
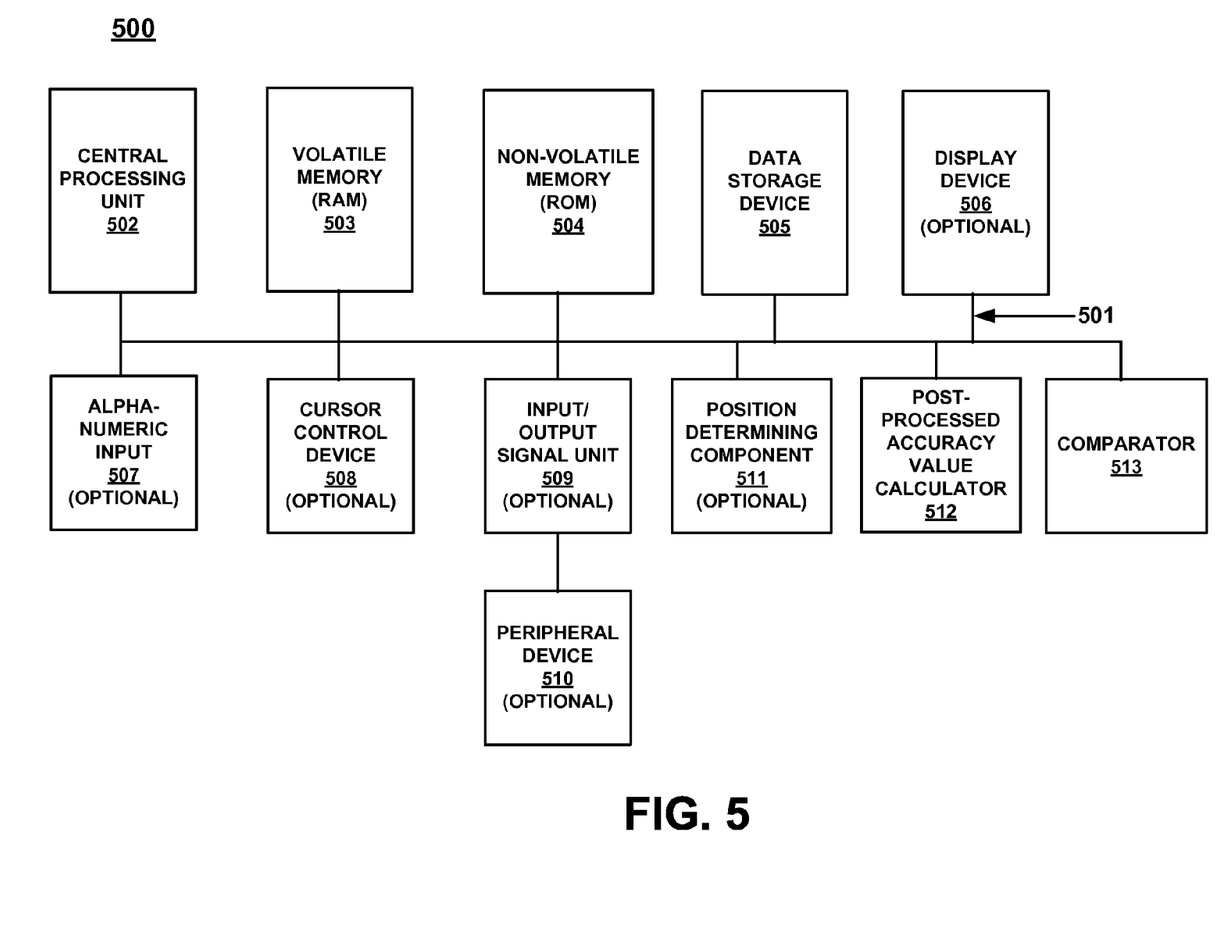
FIG. 5 is a block diagram of a system for logging position data in accordance with one embodiment.

FIG. 5 is a block diagram of a system 500 for logging position data in accordance with one embodiment. In one embodiment, system 500 is implemented upon rover receiver 105 and/or field computer 115. In one embodiment, system 500 is implemented as an add-on component to a general purpose computing device (e.g., field computer 115) or to rover receiver 105. As an example, post-processed accuracy value calculator 512 and comparator 513 may be implemented as discreet hardware components on a peripheral device (e.g., an integrated circuit, or an add-in card) which is coupled with rover receiver 105 and/or field computer 115. Thus, the peripheral device can be communicatively coupled with rover receiver 105 and/or field computer 115 via a wired or wireless interface to those devices to provide the capability of determining post-processed accuracy values for geographic positions in accordance with embodiments of the present technology. It is noted FIG. 5 is intended as one example only. Thus, some components shown in FIG. 5 may be omitted in embodiments to avoid redundancy.

One embodiment of the present technology comprises computer-readable and computer-executable instructions that reside, for example, in system 500. In the present embodiment, system 500 includes an address/data bus 501 for conveying digital information between the various components, a central processor unit (CPU) 502 for processing the digital information and instructions, a volatile main memory 503 comprised of volatile random access memory (RAM) for storing the digital information and instructions, and a non-volatile read only memory (ROM) 504 for storing information and instructions of a more permanent nature. In addition, computer system 500 may also include a data storage device 505 (e.g., a magnetic, optical, floppy, or tape drive or the like) for storing vast amounts of data. It should be noted that the software program for determining post-processed accuracy values for geographic positions in accordance with embodiments of the present technology can also be stored in volatile memory 503, data storage device 505, or in an external storage device (not shown).

Devices which are optionally coupled to computer system 500 include a display device 506 for displaying information (e.g., user interface 300 of FIG. 3), an alpha-numeric input device 507 (e.g., a keyboard), and a cursor control device 508 (e.g., mouse, trackball, light pen, etc.) for inputting data, selections, updates, etc. System 500 can also include a mechanism for emitting an audible signal (not shown). It is noted that display device 506, alpha-numeric input device 507, or cursor control device 508 can be used to input a desired accuracy value which indicates the level of precision in determining geographic positions based upon data from rover receiver 105.

Furthermore, system 500 can include an input/output (I/O) signal unit (e.g., interface) 509 for interfacing with a peripheral device 510 (e.g., a computer network, modem, mass storage device, etc.). Accordingly, computer system 500 may be coupled in a network, such as a client/server environment, whereby a number of clients (e.g., personal computers, workstations, portable computers, minicomputers, terminals, etc.) are used to run processes for performing desired tasks. In particular, computer system 500 can be coupled in a system (e.g., system 200 of FIG. 2) for processing geographic data.

In the embodiment of FIG. 5, system 500 further comprises an optional position determining component 511. Position determining component 511 is configured for receiving positioning and timing signals from a plurality of orbiting navigation satellites and for determining the geographic position of system 500 based thereon.

System 500 further comprises a post-processed accuracy (PPA) value calculator 512. As described above with reference to PPA calculator 130, a prediction of post-processed accuracy is supplied at the time of measurement by post-processed accuracy value calculator 513. This prediction refers to the likely accuracy of the position when it is recalculated later, after the data has been post-processed (e.g., by post-processing engine 120). In one embodiment, post-processing accuracy is predicted during data collection using a look-up table which may be stored, for example, in data storage device 505. The input variables to the look-up table include duration since carrier lock was acquired; horizontal dilution of precision (HDOP), the number of GNSS satellites being continuously tracked, and whether single or dual frequency carrier data is being logged. Post-processed accuracy value calculator 512 inputs the above parameters into a function that looks up a PPA value from a predefined table. The values in the table have been assigned as a result of prior test processing with the parameters. Post-processed accuracy value calculator 512 converts this data and generates a prediction of the accuracy likely to be achieved after post-processing and generates a predicted post-processed accuracy value which indicates the likely accuracy of the position when it is recalculated later, after the data has been post-processed (e.g., by post-processing engine 120).

System 500 further comprises a comparator 513 for comparing a desired accuracy value (e.g., 305 of FIG. 3) with the predicted post-processed accuracy value (e.g., 310 of FIG. 3) output by post-processed accuracy value calculator 512. In one embodiment, when the predicted post-processed accuracy value indicates a level of precision for determining a geographic position which equals or exceeds the desired level of accuracy, comparator 513 generates a signal which indicates that logging of the geographic position can be performed. In one embodiment, if the predicted post-processed accuracy value indicates a level of precision for determining a geographic position which is less than the desired level of accuracy, comparator 513 generates a signal which indicates that the desired level of accuracy has not been met. In response, logging of the geographic data will not occur. In addition, a message may be generated indicating that logging has not occurred, or that additional data should be collected to attain the desired level of accuracy.

Embodiments of the present technology are thus described. While the present technology has been described in particular embodiments, it should be appreciated that the present technology should not be construed as limited by such embodiments, but rather construed according to the following claims.

What is claimed is:

1. A method of logging position data, the method comprising:
receiving, via a user interface of a hardware device, an indication of a desired accuracy value for determining a geographic position, said hardware device including a post-processing accuracy calculator;
receiving, at said hardware device, a geographic position based on GNSS observables received at a GNSS receiver;
calculating, with a post-processing accuracy calculator, a predicted post-processed accuracy value for said geographic position, said post-processing accuracy calculator using input variables supplied by said GNSS receiver to execute a function which looks up said predicted post-processed accuracy value from a predefined table;
comparing, with said hardware device, said desired accuracy value with said predicted post-processed accuracy value for said received geographic position; and
logging said received geographic position into a storage when said predicted post-processed accuracy value for said geographic position is at least as precise as said desired accuracy value.

2. The method as recited in claim 1 further comprising:
calculating said predicted post-processed accuracy value for said received geographic position as a vertical accuracy.

3. The method of claim 1 further comprising:
receiving, at said hardware device, a plurality of received geographic positions, each of said plurality of received geographic positions based on GNSS observables received at said GNSS receiver;
calculating, with said post-processing accuracy calculator, respective predicted post-processed accuracy values for said plurality of received geographic positions, said post-processing accuracy calculator using input variables supplied by said GNSS receiver to execute said function which looks up said respective predicted post-processed accuracy values from said predefined table;
comparing, with said hardware device, said desired accuracy value with said respective predicted post-processed accuracy values; and
logging one of said plurality of received geographic positions into said storage when said predicted post-processed accuracy for said one of said plurality of received geographic positions is at least as precise as said desired accuracy.

4. The method as recited in claim 3 further comprising:
calculating an average of a plurality of said logged received geographic positions; and
calculating position data for a point feature based at least in part from said calculated average.

5. The method as recited in claim 4 further comprising:
calculating position data for a line feature at least partly from a plurality of said logged received geographic positions.

6. The method as recited in claim 1, further comprising:
receiving, at said hardware device, an indication of a selection between said predicted post-processed accuracy value and real-time accuracy value.

7. The method of claim 6 further comprising:
calculating, with said post-processing accuracy calculator, said a post-processed accuracy value in response to the selection of said predicted post-processed accuracy value.

8. A computer usable storage medium having computer readable code embodied therein for causing a computing device to perform a method for implementing method of logging position data, said method comprising:
receiving an indication of a desired accuracy value for determining a geographic position;
receiving a geographic position based on GNSS observables received at a GNSS receiver;
calculating a predicted accuracy value for said received geographic position by using input variables supplied by said GNSS receiver to execute a function which looks up said predicted post-processed accuracy value from a predefined table;
comparing the desired accuracy value with said predicted accuracy value; and
logging said received geographic position if the predicted accuracy is at least as precise as said desired accuracy.

9. The computer usable medium as recited in claim 8 wherein said method further comprises:
calculating said predicted accuracy value as a vertical accuracy value if a measure of the vertical accuracy of said received geographic position has been selected.

10. The computer usable medium as recited in claim 8 wherein said method further comprises:
receiving a plurality of geographic positions, each of said plurality of received geographic positions based on GNSS observables received at said GNSS receiver;
calculating a respective predicted accuracy value for each of said plurality of received geographic positions by using input variables supplied by said GNSS receiver to execute said function which looks up said respective predicted post-processed accuracy values from said predefined table;
comparing each of said respective predicted accuracy values with said desired accuracy values; and
logging at least one of said plurality of received geographic positions if said respective predicted accuracy value of said at least one of said plurality of geographic positions is at least as precise as said desired accuracy.

11. The computer usable medium as recited in claim 10 wherein said method further comprises:
calculating an average of a plurality of said logged received geographic positions; and
calculating position data for a point feature based at least in part from said calculated average.

12. The computer usable medium as recited in claim 11 wherein said method further comprises:
calculating position data for a line feature at least partly from a plurality of said logged received geographic positions.

13. The computer usable medium as recited in claim 8 wherein said method further comprises:
receiving an indication of a selection from the group consisting of a predicted post-processed accuracy value and a predicted real-time accuracy value.

14. The computer usable medium as recited in claim 13 wherein said method further comprises:
calculating said post-processed accuracy value in response to the selection of said predicted post-processed accuracy value.

15. The computer usable medium as recited in claim 13 wherein said method further comprises:
calculating said predicted accuracy value as a real-time processed accuracy value in response to the selection of said predicted real-time accuracy value.

16. A system for implementing the logging of position data, said system comprising:
a post-processed accuracy value calculator configured to generate a predicted post-processed accuracy value for determining a received geographic position, said received geographic position based on GNSS observables received at a GNSS receiver, said post-processing accuracy value calculator using input variables supplied by said GNSS receiver to execute a function which looks up said predicted post-processed accuracy value from a predefined table; and
a comparator coupled with said post-processed accuracy value calculator and configured to compare said predicted post-processed accuracy value with a received indication of a desired accuracy value for determining a geographic position and for generating a signal indicating that logging of said received geographic position can be performed.

17. The system of claim 16 further comprising a geographic position determining component communicatively coupled with said post-processed accuracy value calculator and configured to provide said received geographic position.

18. The system of claim 16 wherein said post-processed accuracy value calculator is further configured to calculate said post-processed accuracy value in response to the selection of said predicted post-processed accuracy value and to calculate a real-time processed accuracy value in response to the selection of said predicted real-time accuracy value.

* * * * *

UNITED STATES PATENT AND TRADEMARK OFFICE
CERTIFICATE OF CORRECTION

| | | |
|---|---|---|
| PATENT NO. | : 8,223,068 B2 | |
| APPLICATION NO. | : 12/545290 | |
| DATED | : July 17, 2012 | |
| INVENTOR(S) | : Robert M. Allan et al. | |

It is certified that error appears in the above-identified patent and that said Letters Patent is hereby corrected as shown below:

On the Title Page Item [56] OTHER PUBLICATIONS:
Delete, "User Guide: GPSs Pathfinder Pro Series"
Insert, --"User Guide: GPS Pathfinder Pro Series--

In the Claims
Column 9, Claim 7, Line 3: Delete "a"

Signed and Sealed this
Fourteenth Day of May, 2013

Teresa Stanek Rea
*Acting Director of the United States Patent and Trademark Office*